(12) United States Patent
Lakhani et al.

(10) Patent No.: US 7,269,167 B2
(45) Date of Patent: Sep. 11, 2007

(54) DIRECT END-OFFICE TRUNKING

(75) Inventors: Faizel Z. Lakhani, Kanata (CA); Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 925 days.

(21) Appl. No.: 10/657,551

(22) Filed: Sep. 8, 2003

(65) Prior Publication Data

US 2004/0081174 A1 Apr. 29, 2004

Related U.S. Application Data

(63) Continuation of application No. 09/220,020, filed on Dec. 23, 1998, now abandoned.

(51) Int. Cl.
*H04L 12/66* (2006.01)
(52) U.S. Cl. .............. 370/352; 370/395.1; 370/395.61
(58) Field of Classification Search ............ 370/395.1, 370/395.2, 395.21, 395.31, 395.41, 396, 370/410, 399, 465, 466, 412, 353, 354, 400, 370/401, 524, 395.61
See application file for complete search history.

(56) References Cited

U.S. PATENT DOCUMENTS

| | | | |
|---|---|---|---|
| 5,327,421 A | 7/1994 | Hiller et al. ............ 370/395.61 |
| 5,452,297 A | 9/1995 | Hiller et al. ............ 370/395.61 |
| 5,463,621 A | 10/1995 | Suzuki ........................ 370/399 |
| 5,483,527 A | 1/1996 | Doshi et al. ................. 370/399 |
| 5,528,592 A | 6/1996 | Schibler et al. ............. 370/397 |
| 5,568,475 A | 10/1996 | Doshi et al. ................. 370/399 |
| 5,623,491 A | 4/1997 | Skoog ........................ 370/397 |
| 5,719,863 A | 2/1998 | Hummel ..................... 370/392 |
| 5,732,071 A | 3/1998 | Saito et al. ................. 370/255 |
| 5,889,773 A | 3/1999 | Stevenson, III ............. 370/352 |
| 6,141,342 A | 10/2000 | Cheesman et al. .......... 370/352 |
| 6,172,973 B1 | 1/2001 | Akhtar et al. ............... 370/354 |
| 6,195,714 B1 * | 2/2001 | Li et al. ....................... 710/31 |
| 6,256,308 B1 | 7/2001 | Carlsson ................ 370/395.43 |
| 6,282,194 B1 * | 8/2001 | Cheesman et al. .......... 370/356 |

FOREIGN PATENT DOCUMENTS

EP 0 488 399 A2 6/1992

* cited by examiner

*Primary Examiner*—Chi Pham
*Assistant Examiner*—Alexander O. Boakye
(74) *Attorney, Agent, or Firm*—Withrow & Terranova, PLLC

(57) ABSTRACT

An apparatus and method for providing direct trunking between a TDM switch and an backbone network are described. The apparatus is an interface adapted to convert pulse code modulated data to the data format of the backbone network and vice versa. The interface is adapted to emulate a trunk peripheral of the TDM switch by communicating with a computing module of the switch using a messaging protocol native to the computing module. The interface may therefore be connected to the TDM switch without any modification of the computing module. The interface is connected directly to a serial link of a fabric interface of the TDM switch. The advantages include a reduction in the capital investment in equipment required to connect a TDM switch to backbone network and a reduced footprint for the equipment.

18 Claims, 3 Drawing Sheets

DIRECT END-OFFICE TRUNKING

This application is a Continuation of application Ser. No. 09/220,020, filed Dec. 23, 1998 now abandoned.

TECHNICAL FIELD

The present invention relates to the field of telecommunications and, in particular, an apparatus and method for directly interfacing time division multiplexed (TDM) switches in a switched telephone network to asynchronous transfer mode (ATM) facilities.

BACKGROUND OF THE INVENTION

ATM switching facilities are typically used by telecommunications providers for data transport, but are being used more frequently to carry bearer traffic associated with telephone calls between switches in the Public Switched Telephone Network (PSTN). The deployment in the PSTN of interfaces to ATM facilities permits ATM facility providers to broaden their customer base, thus improving return on their investment in ATM network infrastructure. ATM facilities enable greater flexibility in call routing, since ATM routing is not restricted by the hierarchical structure that governs call routing in the present day PSTN. In addition, ATM facilities can be owned and operated at relatively lower costs than conventional TDM facilities. ATM switches also have a smaller footprint than TDM switches, so the physical plant is less costly to maintain.

One way in which PSTN switches can be arranged to use an ATM backbone network for inter-switch call completion is described in applicant's co-pending United States patent application entitled TRANSIT TRUNK SUBNETWORK SYSTEM which was filed on 23 Sep. 1998 and assigned Ser. No. 09/158,855, the disclosure of which is incorporated herein by reference. The transit trunk subnetwork includes interfaces between TDM switches and the ATM backbone network, referred to as Multi-Service Platforms (MSPs). The MSPs convert pulse code modulated (PCM) data to ATM cells and vice versa. The MSPs also map TDM trunks to ATM Virtual Channel Connections (VCCs) so that bearer traffic can be transferred through the ATM backbone network between TDM switches in the transit trunk subnetwork.

The transit trunk subnetwork is being implemented as a solution for traffic congestion in the PSTN because it enables traffic to be routed through the ATM backbone network between TDM switches in a transit trunk subnetwork. The transit trunk subnetwork also enables dynamic bandwidth management by controlling VCC allocations on a responsive or a predictive basis to ensure efficient use of bearer traffic facilities. The facilities in the ATM backbone network are therefore reserved only in proportion to demand so that other functions, such as the transfer of data from other networks, may use excess capacity in the network.

ATM facility providers are also experiencing demand for access to ATM facilities by competitive local exchange carriers (CLECs). Since ATM facilities offer lower cost transport for the bearer traffic associated with telephone calls, CLECs regard ATM facilities as a viable alternative for reducing their operating costs to enable more competitive service offerings. Under recent telecommunications regulations implemented the United States, an incumbent local exchange carrier (ILEC) must permit a CLEC to lease access to facilities which are owned and operated by the ILEC for the purpose of providing local service to interested customers. Under such mandated arrangements, the CLEC incurs recurring charges for access to ILEC facilities. Those charges result in lower net operating margins for CLECs. There therefore exists an interest in equipment that is adapted to most simply and inexpensively integrate PSTN switches with an ATM backbone network.

Accordingly, a need exists for an apparatus which reduces the number of components required to interface TDM switches with an ATM backbone network so that the capital investment in such equipment is reduced. A need also exists for an apparatus that permits ATM interfaces to be integrated into the physical plant of a TDM switch so as to reduce the footprint of such systems. Such an integration of facilities substantially reduces the floor space required and, consequently, operating overhead.

SUMMARY OF THE INVENTION

It is an object of the invention to provide an apparatus for direct TDM to ATM trunking which simplifies the interface between TDM switches and ATM facilities to reduce the number of components required to provide an interface to an ATM backbone network.

It is yet another object of the invention to provide an interface between a TDM switch and an ATM backbone network, the interface having a smaller footprint than current interfaces used for the same purpose.

It is a further object of the invention to provide an interface between a TDM switch and an ATM backbone network that emulates a trunk peripheral of the TDM switch so that the interface can be connected directly to a fabric interface of the TDM switch.

It is yet a further object of the invention to provide an interface between a TDM switch and an ATM backbone network that is adapted to interact with a computing module of the TDM switch without modification of the computing module or its messaging system.

The invention therefore provides an apparatus for direct trunking between a time division multiplexed (TDM) switch and an asynchronous transfer mode (ATM) backbone network, comprising an interface adapted for connection to an ATM link for transferring ATM cells to, and receiving ATM cells from, the ATM backbone network, and adapted for connection to at least one serial link for transferring pulse code modulated (PCM) data to, and receiving PCM data from, a fabric of the TDM switch. The interface converts the PCM data to ATM cells and vice versa. The interface is also adapted to emulate a trunk peripheral of the TDM switch so that a computing module of the TDM switch is enabled to communicate with the interface using a protocol for communications with a trunk peripheral native to the computing module.

Accordingly, the invention provides an apparatus which simplifies the interface between TDM switches and ATM facilities by eliminating prior art interface components. The invention further enables the interface to be integrated into the TDM switch infrastructure. This results in a simplified interface containing fewer components which enables migration to ATM facilities with less capital investment.

The invention also provides a method for direct trunking between a time division multiplexed (TDM) switch and an asynchronous transfer mode (ATM) backbone network which comprises the steps of configuring an interface adapted to convert pulse code modulated (PCM) data to ATM cells, and vice versa, so that the interface is adapted to communicate with a computing module of the switch using a messaging protocol native to the switch. The interface thereby emulates a trunk peripheral of the TDM switch. The interface is connected directly to a serial link of a fabric interface of the TDM switch to enable direct trunking between the TDM switch and the ATM backbone network.

Accordingly, the invention is also directed to a method for providing direct ATM trunking between a TDM switch and an ATM backbone network. Direct ATM trunking reduces the number of components required to connect the TDM switch to the ATM backbone network. This reduces the capital investment required to use ATM facilities to offload bearer traffic from the PSTN. The interfaces also occupy less space and can be migrated into the physical plant of the TDM switch.

DETAILED DESCRIPTION OF THE PREFERRED EMBODIMENTS

The present invention is directed to an apparatus and method for interfacing a TDM switch in a switched telephone network to ATM facilities to enable direct TDM to ATM trunking.

Figure 1:
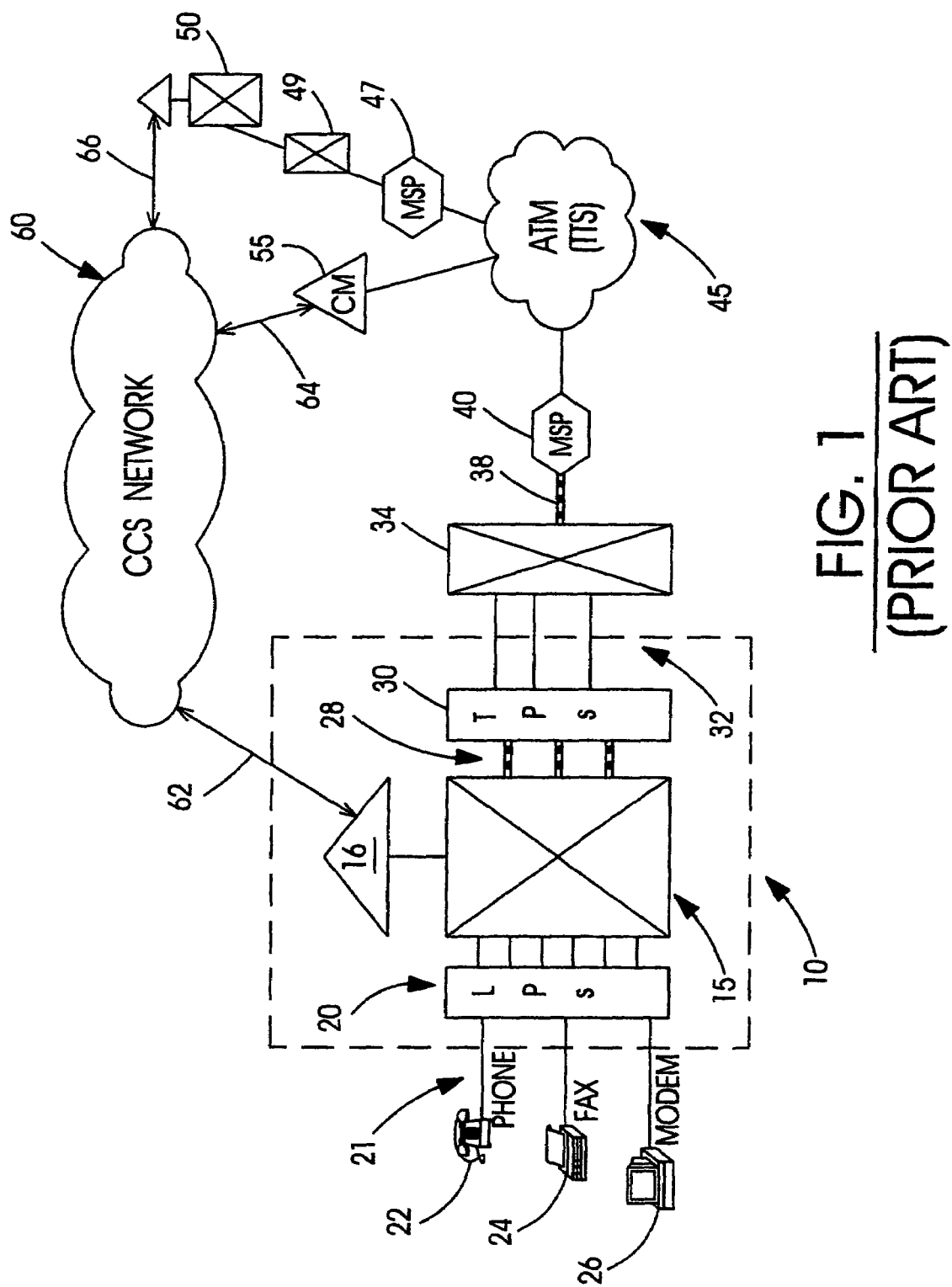
FIG. 1 is a schematic diagram illustrating a topology of a TDM switch in a switched telephone network provided with a prior art interface to an ATM backbone network.

FIG. 1 illustrates a TDM switch 10 equipped with a prior art interface to an ATM backbone network 45 to permit calls originating in the public switched telephone network to be off-loaded to the ATM backbone network for transfer to another TDM switch (not illustrated). The TDM switch 10 is a class 5 end office. It should be understood, however, that the invention is not limited to interfaces for use with class 5 end offices and may be applied to any class of TDM switch in the PSTN. The TDM switch 10 includes a line side, trunk side and a switch fabric 15, as is well understood by persons of ordinary skill in the art.

The line side of the TDM switch 10 includes line peripherals (LPs) 20 which are connected by subscriber lines 21 to assorted equipment on subscriber premises. The line peripherals of a class 5 end office support customer premise equipment, such as telephones 22, facsimile machines 24, modems 26, and the like.

The trunk side of the TDM switch 10 includes switch fabric interfaces 28 that transfer pulse code modulated (PCM) data from the switch fabric 15 to trunk peripherals 30, and vice versa. The trunk peripherals 30 are commonly called digital trunk controllers (DTCs). The switch fabric interfaces 28 typically have high speed optical data transmission lines (buses) for PCM data input/output. The trunk peripherals 30 serve as a demultiplexer for data received from the switch fabric interfaces 28 and as a multiplexer for data received from the trunks 32. The trunk peripherals 30 convert the data received in optical form from the switch fabric interfaces 28 to data in electrical form for transmission over the trunks 32, and vice versa. Furthermore, the trunk peripherals 30 exchange control messages with a computing module 16 of the TDM switch 10 to enable call data to be routed from the switch fabric to the trunks 32, and vice versa.

The trunks 32 are connected to a multiplexer 34, which multiplexes the output of the trunks 31 and converts the multiplexed output to optical form. The optical output is transmitted over an optical link 38 to the MSP 40. The optical link 38 typically operates at an OC-3 rate. The MSP 40 receives the optical input in PCM data format and converts the PCM data to ATM cells, which are transferred over SVCs set up on demand or selected from cache as described in applicant's co-pending United States patent application entitled METHOD AND APPARATUS FOR REDUCTION OF CALL SETUP RATE IN ATM NETWORK, which was filed on 2 Oct. 1998 and assigned application Ser. No. 09/165,189, the specification of which is incorporated herein by reference.

The TDM switches 10 and 50, as well as the call manager 55, are configured to exchange signaling messages through the common channel signaling (CCS) network 60. The CCS network 60 is typically a Signaling System 7 (SS7) Network used to exchange ISDN User Part (ISUP) signaling messages between end offices for controlling call setup and call progress in a manner well known in the art.

Figure 2:
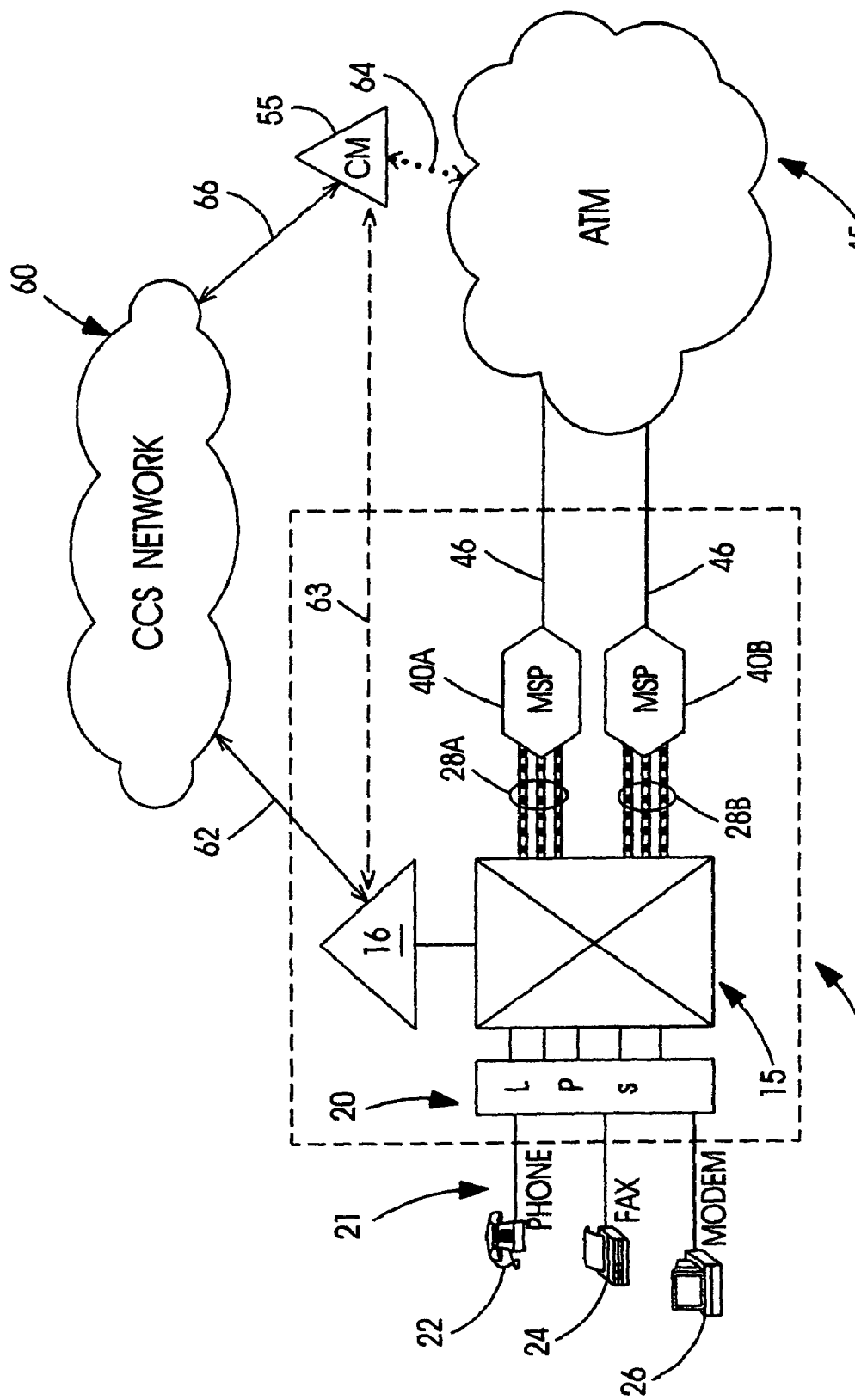
FIG. 2 is a schematic diagram illustrating an interface architecture used for implementing direct ATM trunking between a TDM switch and an ATM backbone network.

FIG. 2 is a schematic diagram of the preferred embodiment of the invention, which enables the integration of the ATM interface into the physical plant of the TDM switch 10. The TDM switch 10 receives bearer traffic associated with telephone calls and routes at least a portion of the bearer traffic to the ATM backbone network 45. As is well understood in the art, PCM data associated with the telephone calls is switched through the switch fabric 15. The PCM data is received from the switch fabric 15 by the switch fabric interfaces 28A and 28B. The switch fabric interfaces are connected directly to a TDM physical interface of the MSPs 40A and 40B. Consequently, the trunk peripherals 30 (FIG. 1) and the multiplexer 34 formerly located between the switch fabric interfaces 28A, 28B and the MSPs 40A, 40B are eliminated.

In order to enable the interface configuration shown in FIG. 2, the MSPs 40A, 40B are adapted to emulate the trunk peripherals 30 (FIG. 1) so that the computing module 16 of the TDM switch 10 need not be modified to accommodate the new configuration of the interface components. The MSPs must therefore be enabled to receive control messages passed through the switch fabric 15 from the computing module 16 and to respond to those control messages in the native messaging protocol used by the computing module 16. The MSPs must also be configured to perform other functions of the trunk peripherals 30 so that each MSP appears to the computing module 16 to be a trunk peripheral, such as a digital trunk controller.

The computing module 16 exchanges control messages with the trunk peripheral 30 illustrated in FIG. 1. Those control messages are used to identify calls that are entering or exiting the switch fabric, and to route outgoing calls to the appropriate trunk members connected to the trunk peripherals 30 or route incoming call data to an appropriate portion of the switch fabric 15. The MSPs 40A, 40B are therefore configured to exchange the same control messages with the computing module 16. Although no physical trunks exist in the configuration of the interface in accordance with the invention, the MSPs 40A,B perform virtual operations which appear to the computing module 16 to be the operations of a trunk peripheral. For outgoing calls from the switch fabric 15, the computing module 16 provides control information to route each call to a "trunk member", which is a channel in a serial link of a switch fabric interface 28A, B. The control information is used by the MSPs 40A, 40B to map the "trunk member" to a virtual circuit connection set up through the ATM backbone network 45 to transfer the bearer traffic associated with the call. For incoming call to the TDM switch 10 from the ATM backbone network 45, the computing module 16 also sends control information to the appropriate MSP 40A, 40B to enable the mapping of a virtual circuit connection set up or selected to carry bearer traffic associated with the call to a "trunk member" which is likewise a channel in the serial link of one of the switch fabric interfaces 28A, B.

In order to simplify the translations tables in the TDM switch 10, it is preferable to configure the TDM switch so that the virtual trunks that terminate on the MSPs 40A,B are viewed by the TDM switch 10 as a single large trunk group. This is explained in detail in applicant's co-assigned patent entitled APPARATUS AND METHOD FOR COMPLETING INTER-SWITCH CALLS USING LARGE TRUNK GROUPS which was issued as U.S. Pat. No. 6,141,342 on 31 Oct. 2000, the specification of which is incorporated herein by reference.

Figure 3:
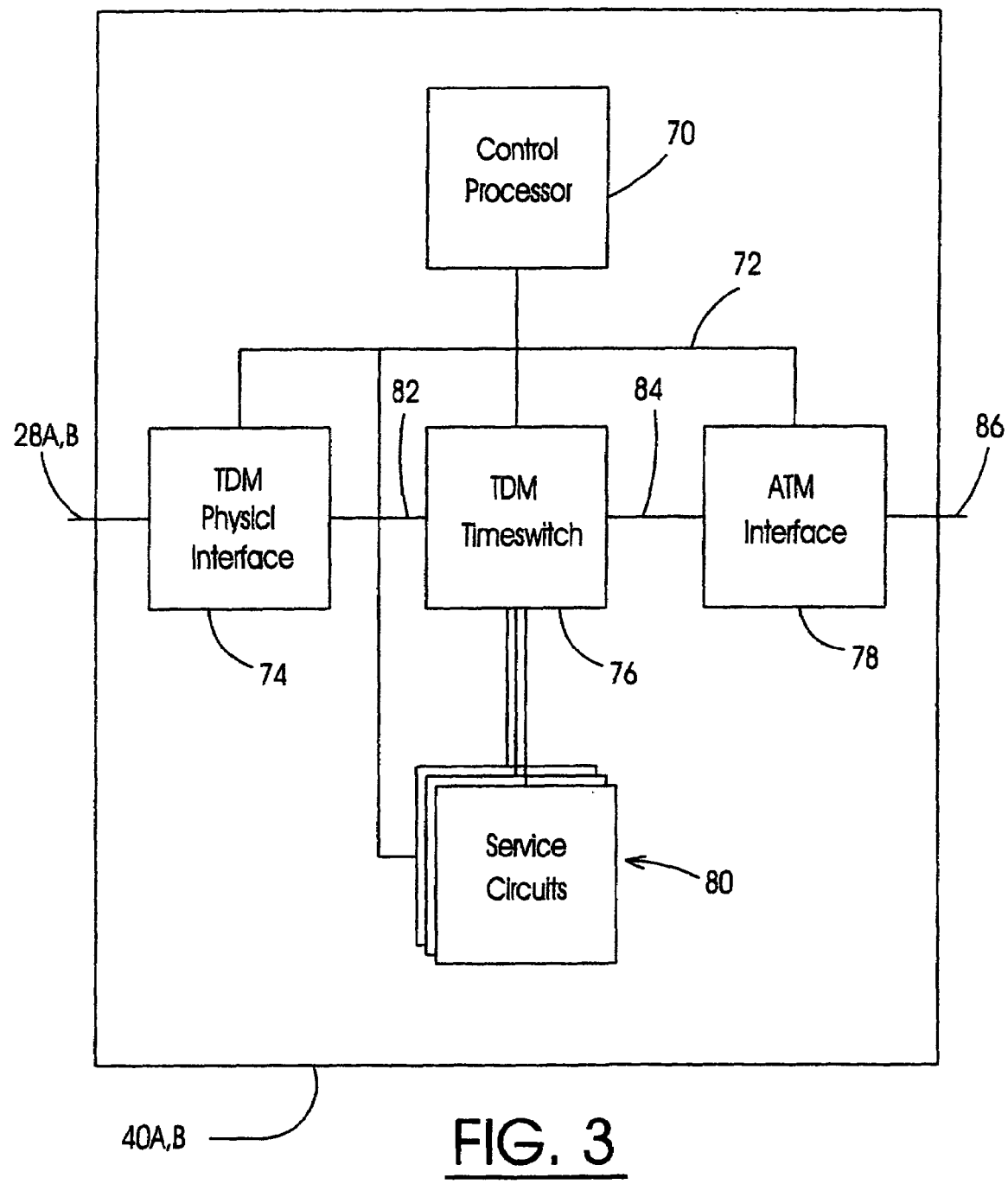
FIG. 3 is a schematic diagram illustrating the internal architecture of an interface in accordance with the invention.

FIG. 3 is a schematic diagram of the principal components of the MSP 40A, 40B shown in FIG. 2. Each MSP 40A, 40B includes a control processor 70, a control bus 72, a TDM physical interface 74, a TDM timwswitch 76, an ATM interface 78 and a plurality of service circuits 80. A first interface bus 82 connects the TDM physical interface 74 with the TDM timwswitch 76. The second interface bus 84 connects the TDM timeswitch 76 with the ATM interface 78.

Control messages and TDM data are received by the MSPs 40A, 40B via the respective switch fabric interfaces 28A, 28B. The optical output of the switch fabric interfaces is converted by the TDM physical interface 74 to electrical form and passed over interface bus 82 to the TDM timeswitch 76. Control messages are switched to the control processor 70 over control bus 72. The control processor 70 emulates the trunk peripheral 30 (FIG. 1) by receiving and responding to control messages sent from the computing module 16 of the TDM switch 10. The control processor 70 also controls the switching of PCM data in response to control messages received from the computing module 16 or on detection of predetermined conditions, in a manner well known in the art, so that the PCM data is routed to a one of the service circuits 80, as required. The service circuits 80 perform the functions of, for example, tone detection, tone generation and echo cancellation, all of which are well known in the art. For PCM data which requires any one of the service circuits 80, the TDM timeswitch routes the PCM data to the service circuit before forwarding it via interface bus 84 to the ATM interface 78. All data switching performed by the TDM timeswitch 76 is performed under control of the control processor 70.

The PCM data received by the ATM interface 78 is converted to ATM cells for transfer through the ATM backbone network 45 (FIG. 2). The ATM interface 78 determines a Quality of Service (QOS) associated with the data for each call. The ATM interface 78 also constructs the 5 byte ATM cell header which is attached to each ATM cell. For telephony applications, the ATM interface 78 is typically configured to recognize one of two quality of service (QOS) types, and direct the data over appropriate channels to be packed into ATM cells based on the QOS type. For data that is constant bit rate voice grade data, the data is directed to a channel connected to a PCM/ATM adaptation module (not shown) which uses the standard ATM Adaptation Layer Service 1 (AAL-1). That module converts the constant bit rate voice grade data to ATM payload and loads standard 48 byte ATM payload cells with the data. The 48 byte payload is then matched with the 5 byte cell header to produce 53 byte ATM cells that can be routed from the MSP through a serial link interface 86. For data that is of a variable or unspecified bit rate, the data is directed over a channel connected to a PCM/ATM adaptation module (not shown) which uses the standard ATM Adaptation Layer Service 5 (AAL-5). That module converts the variable or unspecified bit rate data to ATM payload and loads standard 48 byte ATM payload cells with the data. The 48 byte payload is then matched with the 5 byte cell header to produce the 53 byte ATM cells which can be transferred from the MSP 40A,B at the serial interface 86.

Those skilled in the art will realize that the MSP 40 simultaneously conducts the reverse process in which ATM cells are converted to PCM data for routing to TDM switch 10. In that process, the payload of the ATM cells are unloaded and converted to PCM data in optical form and output on the serial links 28A,B. Those skilled in the art will also understand that in addition to performing all of the functions required to emulate a digital trunk controller, the MSP 40A, 40B likewise performs all of the functions related for virtual channel connection set up and control in the ATM backbone network, as described in detail in the three co-pending patent applications referenced above.

The invention therefore provides a simplified interface that permits direct trunking between a TDM switch and an ATM backbone network. Not only is the capital investment in interface equipment reduced, the interface equipment may be moved into the physical plant of the TDM switch. This further simplifies the architecture of the interface, reduces the footprint of the components and ensures more reliable service.

Changes and modifications to the above described embodiments will no doubt become apparent to persons skilled in the art. The scope of the invention is therefore intended to be limited solely by the scope of the appended claims.

We claim:

1. Apparatus for direct trunking between a time division multiplexed (TDM) switch and an asynchronous transfer mode (ATM) backbone network, comprising:
   an interface adapted for connection to an ATM link for transferring ATM cells to, and receiving ATM cells from, the ATM backbone network, and adapted for connection to at least one serial link for transferring pulse code modulated (PCM) data to, and receiving PCM data from, a fabric of the TDM switch, the interface converting the PCM data to ATM cells and vice versa; and
   the interface being further adapted to emulate a trunk peripheral of the TDM switch so that a computing module of the TDM switch is enabled to communicate with the interface using a protocol native to the computing module for communications with a trunk peripheral.

2. The apparatus as claimed in claim 1 wherein the trunk peripheral emulated by the interface is a digital trunk controller.

3. The apparatus as claimed in claim 1 wherein the serial link is connected to a switch fabric interface that receives PCM data from, and transfers PCM data to, a fabric of the TDM switch.

4. The apparatus as claimed in claim 3 wherein the switch fabric interface converts data received from the fabric in electrical form to data in optical form for transfer over the serial link to the interface.

5. The apparatus as claimed in claim 1 wherein the interface is adapted to formulate and transfer messages through the ATM backbone network to peer interfaces connected to the ATM network. in order to set up connections for TDM calls.

6. The apparatus as claimed in claim 5 wherein the interface is further adapted to formulate and transfer ATM signaling messages in order to initiate the set up and release of ATM virtual channel connections in the ATM backbone network.

7. The apparatus as claimed in claim 5 wherein the TDM switch is configured to view the interface as a trunk peripheral that supports a single large trunk group.

8. A method of providing direct trunking between a time division multiplexed (TDM) switch and an asynchronous transfer mode (ATM) backbone network, comprising the steps of:
configuring an interface adapted to convert pulse code modulated (PCM) data to ATM cells, and vice versa, so that the interface is adapted to communicate with a computing module of the switch using a messaging protocol native to the switch and the interface thereby emulates a trunk peripheral of the TDM switch; and
connecting the interface directly to a serial link of a fabric interface of the TDM switch to enable direct trunking between the TDM switch and the ATM backbone network.

9. The method as claimed in claim 8 wherein the interface is further configured to formulate and send messages through the ATM backbone network to peer interfaces in order to set up and release calls between the TDM switch and other TDM switches connected to the ATM backbone network.

10. The method as claimed in claim 9 wherein the interface is further configured to formulate and send ATM signaling messages to initiate the setup or release of ATM virtual channel connections for the transfer of bearer traffic associated with the calls.

11. The method as claimed in claim 8 wherein the TDM switch is configured to view the interface as a trunk peripheral that supports a single large trunk group.

12. The method as claimed in claim 8 wherein the TDM switch is configured to view a plurality of interfaces as a collection of trunk peripherals that support a single large trunk group.

13. Apparatus for direct trunking between a time division multiplexed (TDM) switch and an asynchronous transfer mode (ATM) backbone network, comprising:
an interface adapted for connection to an ATM link for transferring ATM cells to, and receiving ATM cells from, the ATM backbone network, and adapted for connection to at least one serial link for transferring pulse code modulated (PCM) data to, and receiving PCM data from, a fabric of the TDM switch, the interface converting the PCM data to ATM cells and vice versa;
the interface being further adapted to emulate a trunk peripheral of the TDM switch and to communicate with peer interfaces connected to the ATM backbone to control virtual channel connections for TDM calls.

14. The apparatus as claimed in claim 13 wherein the interface is adapted to communicate with a computing module of the TDM switch using a protocol native to the computing module.

15. A method of providing direct trunking between a time division multiplexed (TDM) switch and an asynchronous transfer mode (ATM) backbone network, comprising the steps of:
configuring an interface adapted to convert pulse code modulated (PCM) data to ATM cells, and vice versa, so that the interface is adapted to emulate a trunk peripheral of the TDM switch and to communicate with other interfaces connected to the ATM backbone network to control virtual channel connections for TDM calls; and
connecting the interface directly to a serial link of a fabric interface of the TDM switch to enable direct trunking between the TDM switch and the ATM backbone network.

16. The method as claimed in claim 15 wherein the interface is controls the virtual channel connections for TDM calls by sending messages through the ATM backbone network to other interfaces in order to set up and release calls between the TDM switch and other TDM switches connected by other interfaces to the ATM backbone network.

17. The method as claimed in claim 16 wherein the interface is further configured to formulate and send ATM signaling messages to an ATM switch to which the interface is connected to initiate the set up or release of ATM virtual channel connections for the transfer of bearer traffic associated with the TDM calls.

18. The method as claimed in claim 15 wherein the TDM switch is configured to view the interface as a digital trunk controller that supports a single large trunk group.

* * * * *